(12) United States Patent
Freeman et al.

(10) Patent No.: US 10,469,803 B2
(45) Date of Patent: *Nov. 5, 2019

(54) SYSTEM AND METHOD FOR PRODUCING THREE-DIMENSIONAL IMAGES FROM A LIVE VIDEO PRODUCTION THAT APPEAR TO PROJECT FORWARD OF OR VERTICALLY ABOVE AN ELECTRONIC DISPLAY

(71) Applicant: Maxx Media Group, LLC, Philadelphia, PA (US)

(72) Inventors: Richard S. Freeman, Philadelphia, PA (US); Scott A. Hollinger, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,142

(22) Filed: Sep. 14, 2017

(65) Prior Publication Data
US 2018/0160078 A1   Jun. 7, 2018

Related U.S. Application Data

(63) Continuation-in-part of application No. 15/665,423, filed on Aug. 1, 2017, now Pat. No. 10,230,939.
(Continued)

(51) Int. Cl.
*G06T 19/00*   (2011.01)
*H04N 7/15*   (2006.01)
(Continued)

(52) U.S. Cl.
CPC ............ *H04N 7/157* (2013.01); *G06T 13/40* (2013.01); *H04N 7/147* (2013.01); *H04N 13/189* (2018.05); *H04N 13/194* (2018.05); *H04N 13/239* (2018.05); *H04N 13/279* (2018.05); *H04N 13/332* (2018.05)

(58) Field of Classification Search
CPC .................................................. G06T 19/006
See application file for complete search history.

(56) References Cited

U.S. PATENT DOCUMENTS 3,723,904 A   3/1973 Bernier
5,790,284 A   8/1998 Taniguchi et al.
(Continued)

*Primary Examiner* — Phong X Nguyen
(74) *Attorney, Agent, or Firm* — LaMorte & Associates, P.C.

(57) ABSTRACT

A system and method for communicating between a first person at a first location and one or more people at remote locations. A production set is established at the first location where the first person is imaged with stereoscopic video cameras. The stereoscopic footage is digitally enhanced with 3D effects to create a production video file. The production video file is transmitted to an electronic device at one or more remote locations. The production video file is played and creates images of the first person at the first location. On a display screen at the remote locations, the images appear three dimensional to the remote viewers. Furthermore, the images appear to extend in front of, or above, the display screen of the electronic device.

22 Claims, 5 Drawing Sheets

Related U.S. Application Data which is a continuation-in-part of application No. 15/481,447, filed on Apr. 6, 2017, now Pat. No. 10,136,121.

(60) Provisional application No. 62/319,788, filed on Apr. 8, 2016.

(51) Int. Cl.
*G06T 13/40* (2011.01)
*H04N 13/189* (2018.01)
*H04N 13/194* (2018.01)
*H04N 13/279* (2018.01)
*H04N 13/332* (2018.01)
*H04N 7/14* (2006.01)
*H04N 13/239* (2018.01)

(56) References Cited

U.S. PATENT DOCUMENTS

| | | | |
|---|---|---|---|
| 6,121,972 A | 9/2000 | Takahashi et al. | |
| 6,614,427 B1 | 9/2003 | Aubrey | |
| 6,657,998 B2 | 12/2003 | Li | |
| 7,364,300 B2 | 4/2008 | Favalora et al. | |
| 7,589,759 B1 * | 9/2009 | Freeman | H04N 13/211 348/49 |
| 8,125,485 B2 | 2/2012 | Brown | |
| 2006/0079325 A1 | 4/2006 | Trajkovic | |
| 2006/0294465 A1 | 12/2006 | Ronen | |
| 2008/0079660 A1 * | 4/2008 | Fukushima | H04N 13/275 345/7 |
| 2008/0246759 A1 | 10/2008 | Summers | |
| 2011/0063420 A1 | 3/2011 | Masuda | |
| 2011/0109720 A1 | 5/2011 | Smolic et al. | |
| 2012/0086783 A1 | 4/2012 | Sareen | |
| 2012/0113106 A1 | 5/2012 | Choi | |
| 2012/0263372 A1 | 10/2012 | Adachi et al. | |
| 2012/0314934 A1 * | 12/2012 | Kudo | G06F 3/04845 382/154 |
| 2013/0212501 A1 | 8/2013 | Anderson | |
| 2013/0215229 A1 * | 8/2013 | Yerli | G06T 13/20 348/46 |
| 2013/0234934 A1 * | 9/2013 | Champion | G06F 3/012 345/156 |
| 2013/0278727 A1 | 10/2013 | Tamir et al. | |
| 2013/0303285 A1 * | 11/2013 | Kochi | G06T 19/006 463/32 |
| 2014/0317575 A1 * | 10/2014 | Ullmann | G06T 19/20 715/852 |
| 2015/0244976 A1 * | 8/2015 | Chen | H04N 7/141 348/14.07 |
| 2016/0063713 A1 * | 3/2016 | Okamoto | G06T 7/74 345/419 |
| 2016/0086379 A1 | 3/2016 | Sadi et al. | |
| 2016/0148429 A1 * | 5/2016 | Groppa | G06T 19/006 345/419 |
| 2016/0180590 A1 | 6/2016 | Kamhi et al. | |
| 2017/0148250 A1 * | 5/2017 | Angermayer | G06T 17/20 |
| 2017/0294052 A1 | 10/2017 | Freeman et al. | |
| 2018/0322702 A1 * | 11/2018 | Djajadiningrat | A61N 1/3993 |

* cited by examiner

SYSTEM AND METHOD FOR PRODUCING THREE-DIMENSIONAL IMAGES FROM A LIVE VIDEO PRODUCTION THAT APPEAR TO PROJECT FORWARD OF OR VERTICALLY ABOVE AN ELECTRONIC DISPLAY

RELATED APPLICATIONS

This application is a continuation-in-part of co-pending U.S. patent application Ser. No. 15/665,423, filed Aug. 1, 2017, which is a continuation-in-part of co-pending U.S. patent application Ser. No. 15/481,447, filed Apr. 6, 2017 which claims benefit of U.S. Provisional Patent Application No. 62/319,788, filed Apr. 8, 2016.

BACKGROUND OF THE INVENTION

1. Field of the Invention

In general, the present invention relates to systems and methods that are used to create three-dimensional images that are displayed on an electronic display at a computer interface. More particularly, the present invention relates to systems, methods used to creating three-dimensional images that are based upon live camera footage obtained by photographic or video recording of live subjects or real objects.

2. Prior Art Description

People interact with computers for a wide variety of reasons. As computer software becomes more sophisticated and processors become more powerful, computers are being integrated into many parts of everyday life. In the past, people had to sit at a computer keyboard or engage a touch screen to interact with a computer. In today's environment, many people interact with computers merely by talking to the computer. Various companies have programmed voice recognition interfaces. For example, Apple Inc., has developed Siri® to enable people to verbally interact with their iPhones®. Amazon Inc. has developed Alexa® to enable people to search the world wide web and order products through Amazon®.

Although interacting with a computer via a voice recognition interface is far more dynamic than a keypad or touch pad, it still has drawbacks. The artificial intelligence algorithms used for voice interaction interfaces are very limited. As such, voice interaction interfaces can only answer certain basic queries and those queries must contain specific key words. If more complex matters need to be communicated, there is no current substitute for talking to a real knowledgeable person. It is for this reason that most people prefer speaking to a live person on a telephone rather than interacting with a question and answer computerized phone system. Likewise, when a person is provided with the option of talking a live person on a telephone or interacting with a live person face to face, most people prefer the face to face option. When two humans communicate face to face, many of the communication queues used in the conversation are visual in natural. The manner in which a person moves their eyes, tilts their head, or provides any facial expression or hand gesture, conveys significant additional meaning to words that are being spoken. When communications are purely based on audio signals, such as during a phone call, much of the nuance communicated by human body language is lost. Likewise, when a computer communicates with a human through an audio interface, nuanced information is lost.

It is not possible to provide a live person to stand around every computer in the world. However, it is possible to provide a three-dimensional image of a live person or real object to any computer or digital display that is enabled to present such an image. In the prior art, there are many systems that enable a person to video conference with a live person at a remote location. There are also systems that enable people to call-up an avatar. For instance, in U.S. Patent Application Publication No. 2006/0294465 to Ronene, an avatar system is provided for a smart phone. The avatar system provides a face that changes expression in the context of a conversation. The avatar can be customized and personalized by a user. A similar system is found in U.S. Patent Application Publication No. 2006/0079325 to Trajkovic which shows an avatar system for smart phones. The avatar can be customized, where aspects of the avatar are selected from a database.

An obvious problem with such prior art systems is that the video image of the person you are talking to or the avatar you are viewing is two-dimensional. Furthermore, if a smart phone is being used, the image being viewed is on a screen that may be less than two inches wide. Accordingly, much of the visual information being communicated can be difficult to see and easy to miss.

Little can be done to change the screen size on many devices such as smart phones. However, many of the disadvantages of a small two-dimensional avatar can be overcome or minimized by presenting an image that is three-dimensional. This is especially true if the three-dimensional effects designed into the image cause the image to appear to project out of the plane of the display. In this manner, the image will appear to stand atop the smart phone during a conversation.

In the prior art, there are many systems that exist for creating stereoscopic and auto-stereoscopic images that appear three-dimensional. However, most prior art systems create three-dimensional images that appear to exist behind or below the plane of the electronic screen. That is, the three-dimensional effect would cause an image to appear to extend down into the screen of a smart phone. The screen of the smart phone would appear as a window atop the underlying three-dimensional virtual environment. With a small screen, this limits the ability of the 3D image to provide visual communication queues.

A need therefore exists for creating an 3D image that can be used to provide live communications between a person at a first location and one or more people at remote locations, wherein the images used for communication appear three-dimensional and also appear to extend out from the electronic display from which it is shown. This need is met by the present invention as described and claimed below.

SUMMARY OF THE INVENTION

The present invention is a system and method for communicating between a first location and one or more remote locations. A production set is established at the first location. At the production set, a first person or object is imaged with stereoscopic video cameras to obtain stereoscopic footage. The stereoscopic footage is digitally enhancing with 3D effects to create a production video file. The production video file is transmitted to an electronic device at a second location through a data network. The electronic device has a display screen that can be viewed by a second person at the second location.

The production video file is played on the electronic device, wherein the production video file creates images of the first person or object at the first location. On the display screen, the images appear three dimensional to the second person. Furthermore, the images appear to extend in front of, or vertically above, the display screen of the electronic device.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be used to create and display interactive 3D images for a variety of purposes, the embodiments illustrated show only a few exemplary applications of the technology. Additionally, although the 3D images can be displayed on any type of electronic display, the illustrated embodiments show the 3D images displayed on the screen of a smart phone and on a screen of a stationary display. These embodiments are also selected for the purposes of description and explanation only. The illustrated embodiments are merely exemplary and should not be considered a limitation when interpreting the scope of the appended claims.

Figure 1:
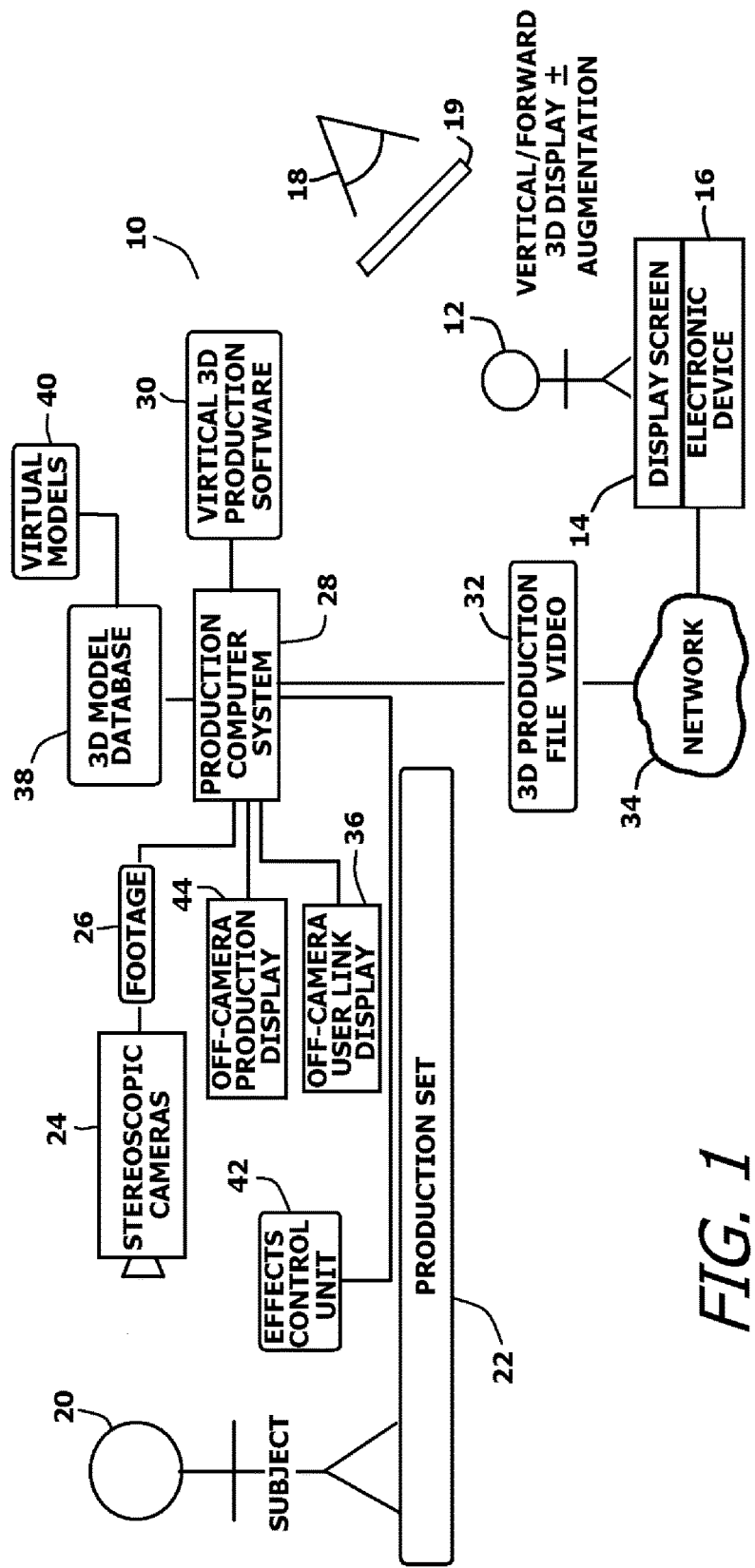
FIG. 1 is a block diagram schematic illustrating the components utilized in an exemplary embodiment of the present invention.

In the present invention, a communications system is established between at least two locations. As part of the communications system, enhanced 3D images are transmitted in at least one direction. The 3D images are created by imaging a live person, or some other object, at a live production set. Referring to FIG. 1, an exemplary embodiment is provided that shows a two-way communication system 10. The communication system 10 transmits 3D images 12 in one direction. As will be explained, the communication system 10 enables communications between a first person who creates the 3D images 12 and a second person who views the 3D images 12. The 3D images 12 are viewed on the display screen 14 of an electronic device 16. The display screen 14 is accessible by a viewer 18, wherein the 3D image 12 appears to have enhanced three dimensional effects when viewed. The enhanced 3D effects cause the 3D images to appear to extend vertically above, or in front of, the display screen 14 of the electronic device 16 displaying the 3D images 12. If the electronic device 16 has a traditional display screen 14, such as an LED or LCD, then the 3D images 12 must be viewed through some form of 3D glasses 19 to appear three dimensional to the viewer 18. If the electronic device 16 has an auto-stereoscopic display or similar specialized 3D display, then the 3D image 12 can appear three dimensional to the naked eye.

The real person or object appearing in the 3D images 12 is referred to as the camera subject 20. The camera subject 20 is imaged at a live production set 22. The live production set 22 has stereoscopic video cameras 24 and other hardware necessary to image the camera subject 20 and produce the 3D images 12. It should be understood that the live production set 22 need not be an existing place. Rather, the live production set 22 can be created wherever needed. For example, the live production set 22 can be temporarily erected in a college classroom to create a 3D image 12 from a professor teaching a class.

The 3D images 12 are based upon the imaging of the camera subject 20. Therefore, the 3D images 12 move as the camera subject 20 at the live production set 22 moves. The 3D images 12 also appear three dimensional, extending either vertically above or in front of the display screen 14 depending upon the orientation of the display screen 14. The communication system 10 can be fully interactive. That is, not only can the camera subject 20 at the live production set 22 communicate with the viewer 18 through the 3D images 12, but the viewer 18 also can communicate with the camera subject 20. This two-way communication enables the viewer 18 of the 3D images 12 to ask a question and the camera subject 20 can react to the question and answer that question through the 3D images 12.

With continued reference to FIG. 1, the creation of the 3D images 12 is first explained. In the live production set 22, there are at least one set of stereoscopic cameras 24. Each set of stereoscopic cameras 24 include a left view camera and a right view camera. The stereoscopic cameras 24 produce raw footage 26 that is processed by a production computer system 28. The production computer system 28 runs specialized 3D effects software 30 that alters the raw footage 26 and superimposes the raw footage 26 from the stereoscopic cameras 24 to create a production video file 32 with integrated 3D effects. The 3D effects are engineered to cause the 3D image 12 to appear to extend vertically above, or in front of, the display screen 14 when viewed. The operation of the 3D effects software needed to produce the stated 3D effects in 3D image 12 is explained in co-pending U.S. patent application Ser. No. 15/665,423, entitled "System, Method And Software For Producing Live Video Containing Three-Dimensional Images That Appear To Project Forward Of Or Vertically Above A Display", the disclosure of which is herein incorporated by reference.

The production video file 32 is transmitted to the electronic device 16 of the viewer 18 via a data network 34. The data network 34 can be a cellular network or a computer network, such as the World Wide Web. The production video file 32 can be recorded for later play by a viewer. For example, if the electronic display 14 where an information station at a museum display, a prerecorded production video file 32 can be played each time an information button is pressed at the museum display. However, since the production video file 32 is created from a live camera subject 20, the communication system 10 is especially well suited for live streaming the production video file 32 to the electronic device 16 of the viewer 18. In this manner, the viewer 18 can also stream questions and comments back to the camera subject 20 in the live production set 22.

If the electronic device 16 being used by the viewer 18 has a microphone, then the viewer 18 can send audio messages back to the live production set 22. Likewise, if the electronic device 16 has a camera and a microphone, as do most smart phones and tablet computers, then the viewer 18 can send audio and video messages back to the live production set 22. Messages sent upstream from the viewer 18 to the live production set 22 are displayed on an off-camera display 36 that can be viewed and/or heard by the camera subject 20, if the camera subject is a person. Alternatively, the message can be fielded by an off-camera production worker. In either scenario, someone at the live production set 22 can hear and/or see questions and comments posted by the viewer 18. The camera subject 20, a production worker, or a software operated AI assistant can then react to those questions and comments. The viewer 18 receives reactions and answers from the camera subject 20 through the 3D images 12 extending vertically above, or in front of, the display screen 14 of the viewer's electronic device 16.

In addition to showing the 3D images 12 of the camera subject 20 to the viewer 18 in forward or vertically projecting 3D, the production video file 32 can be augmented to better communicate information from the camera subject 20 to the viewer 18. In FIG. 1, it can be seen that the production computer system 28 has access an 3D model database 38. In the 3D image database 38 contains virtual models 40 that have been previously created and engineered to contain enhanced 3D effects. The enhanced 3D effects in the virtual models 40 are also the type that cause the virtual models 40 to appear to project forward, or above, the display screen 14 of the electronic device 16 when viewed. The creation of virtual models 40 with such effects is disclosed in co-pending U.S. patent application Ser. No. 15/665,423, entitled "System, Method And Software For Producing Live Video Containing Three-Dimensional Images That Appear To Project Forward Of Or Vertically Above A Display", the disclosure of which is herein incorporated by reference.

The selection of a virtual model 40 from the 3D image database 38 can be done by the camera subject 20 or someone else at the live production set 22 using an effects control unit 42. The effects control unit 42 can be as simple as a computer mouse or slide show controller. The camera subject 20 can select from a menu posted on an off-camera production display 44. Alternatively, the image or video can be recalled from the 3D model database 38 by a production assistant who understands the choreography of the presentation. If an AI assistant is being used, then the selection of a virtual model 40 may be managed by an automated system programmed to respond according to a predetermined routine, or to respond based on input or requests from a viewer.

Figure 2:
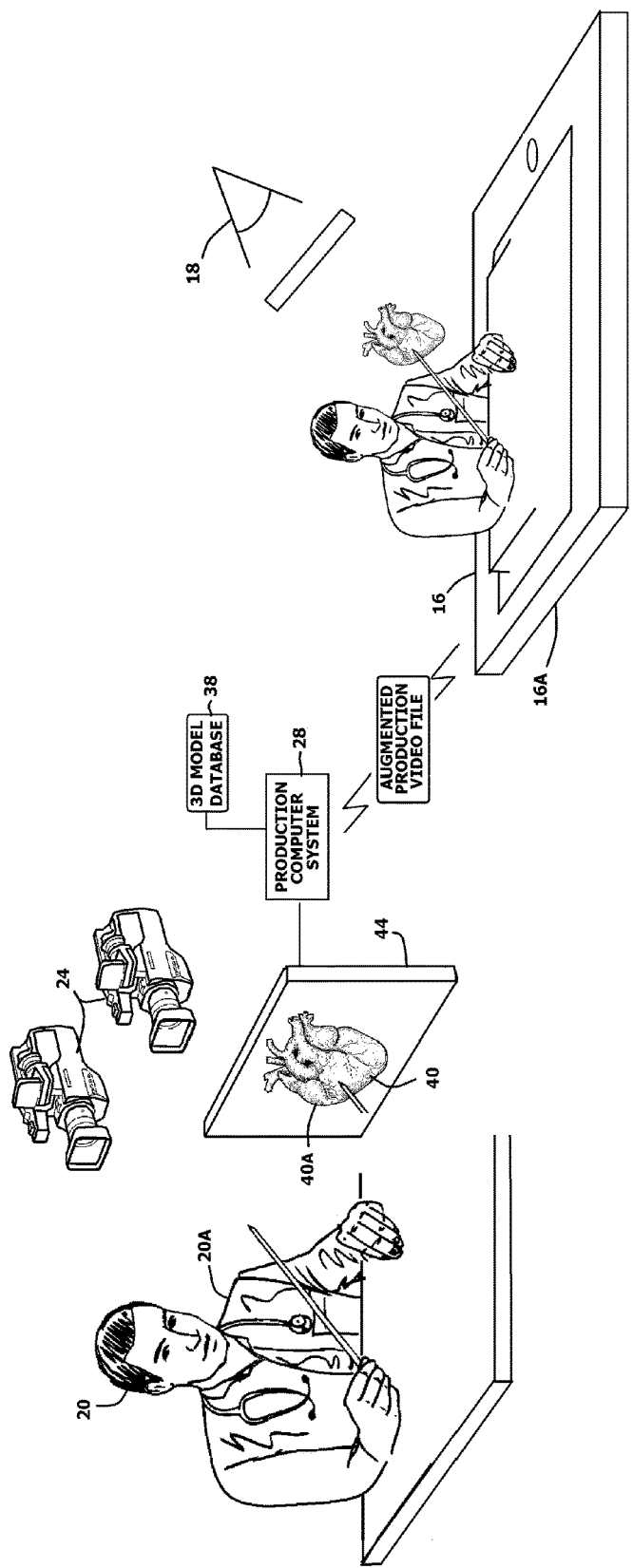
FIG. 2 is a diagram illustrating the present invention system being utilized in a first exemplary use.

An example of this feature is shown in FIG. 2. Referring to FIG. 2 in conjunction with FIG. 1, it will be understood that the exemplary camera subject 20 is a professor 20A who is providing a live on-line lecture. The viewer 18 may be a medical student who has a question about some aspect of the heart. The viewer 18 communicates that question to the camera subject 20 using an electronic device 16 in the form of a smart phone 16A. Upon receipt of the question, the professor 20A can recall a 3D virtual model 40 of a heart 40A from the 3D model database 38. The professor 20A selects the image and positions that virtual model 40 by viewing the off-screen production display 44. The virtual model 40 selected by the professor 20A is superimposed over the production video file 32 being create live. This produces an augmented production video file 32A that is sent to the viewer 18. The viewer 18 sees both the 3D images 12 of the professor 20A and the virtual model 40 of the heart 40A in the same virtual environment. By referencing the off-screen production display 44, the professor 20A can point to different aspects of the heart 40A as he/she answers the question. Such a communication system 10 is highly useful for customer support centers, wherein a customer support representative can demonstrate to a customer how to connect a cable box, assembly modular furniture, or otherwise trouble shoot some problem.

Augmenting the production video file 32 with a virtual model 40 requires more than simply overlaying the two files. Rather, in order to maintain the optimal 3D effects, the virtual model 40 must be oriented to match the camera settings used in the creation of the production video file 32. In the live production set 22, the camera subject 20 is being imaged by stereoscopic cameras 24. The height of the stereoscopic cameras 24, the orientation of the stereoscopic cameras 24, and the distance between the stereoscopic cameras 24 are all very important parameters when creating the enhanced 3D effects. These settings, among others, are read by the production computer system 28.

The virtual models 40 held in the 3D model database 38 are computer constructs. Accordingly, they can be viewed at any angle from any viewpoint in a virtual environment. The selected virtual model 40 is configured to be at viewed with the same camera settings as are being used in the live production set 22 to view the camera subject 20. In this manner, when the virtual model 40 is superimposed over the production video file 32, both images have continuity in viewpoint and camera settings. This makes the virtual model 40 and the 3D images 12 visually consistent in the same virtual environment. Being visually consistent, the engineered 3D effects are also visually consistent and work together seamlessly when seen by the viewer 18.

Figure 3:
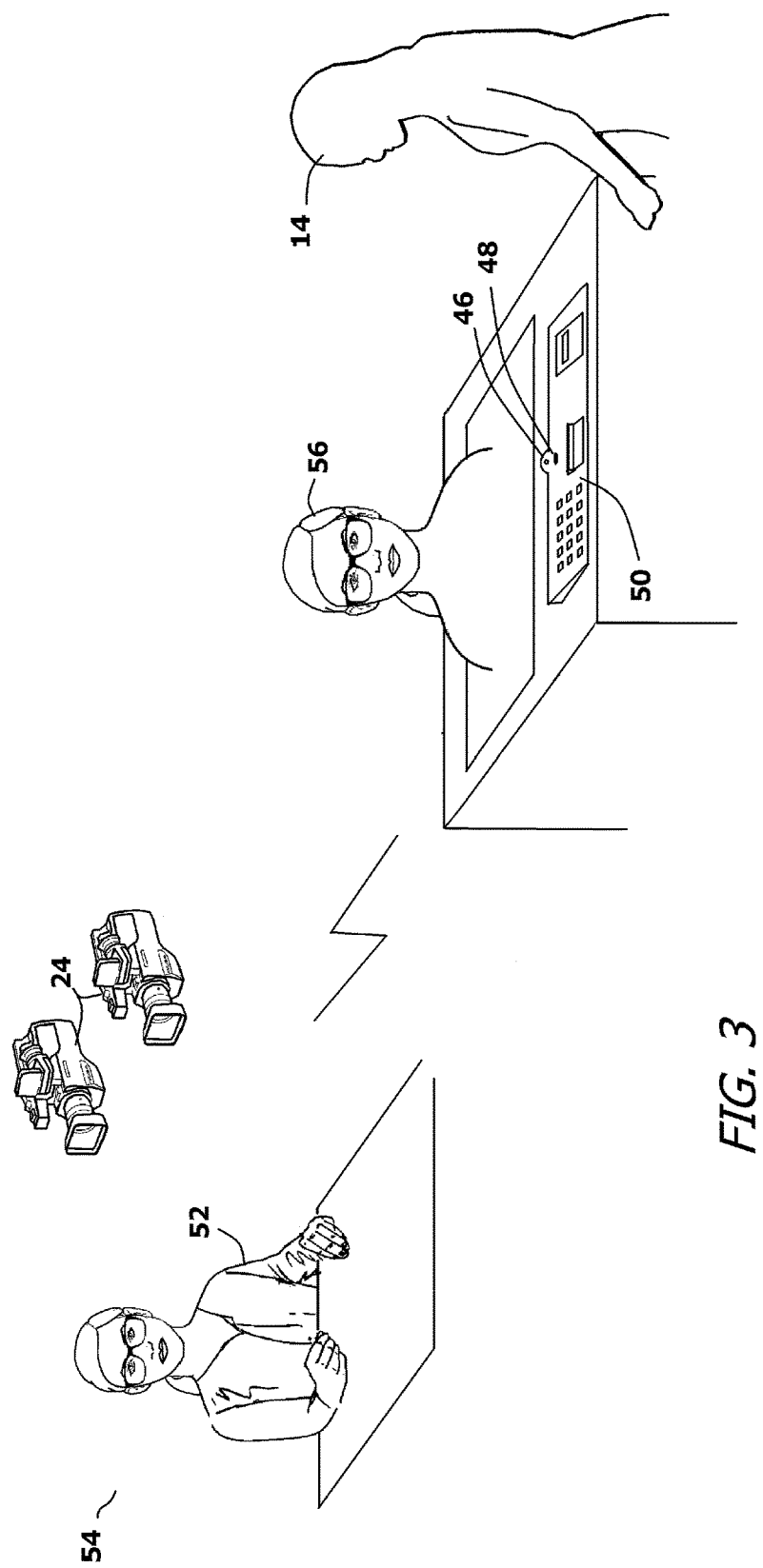
FIG. 3 is a diagram illustrating the present invention system being utilized in a second exemplary use.

In the previous embodiments, the viewer 18 is viewing the 3D image 12 or the augmented 3D image using his/her own electronic device 16. Assuming such an electronic device 16 is a smart phone, tablet, laptop computer or desktop computer, the electronic display 16 has a traditional display that is designed to display 2D images. With such displays, 3D glasses 19 are required to see the 3D effects. Referring to FIG. 3, an example is provided where a viewer 18 can utilize the present system without their own electronic device and without specialized 3D glasses. In FIG. 3, an exemplary reception station 42 is shown. The reception station 42 may be the concierge desk at a hotel, an information desk at a hospital, or a kiosk in an amusement park. Regardless, the reception station 42 contains a display 44, a camera 46, a microphone 48 and a user interface 50. The reception station 42 is connected to a remote live production set 54 that contains one or more live receptionists 52.

A viewer 14 approaches the reception station 42 and activates the display 44. The activation of the reception station may be achieved using passive sensors which detect an approaching user, or may be achieved via the user interface 50. The display 44 here is preferably an auto stereoscopic display based on any technology capable of showing 3D stereoscopic images without the need for specialized glasses. Once activated, the reception station 42 is linked to the live production set 54 and a 3D image 56 appears on the display 44. The live production set 54 can see and hear the viewer 18 via the camera 46 and microphone 48 at the reception station 42. The user interface 50 at the reception station 42 may also contain a credit card reader, ticket dispenser, or other such device or integrated software that may assist in conducting business. The viewer 18 can interact with the 3D image 56 in the same manner as if the receptionist 52 where physically present.

Figure 4:
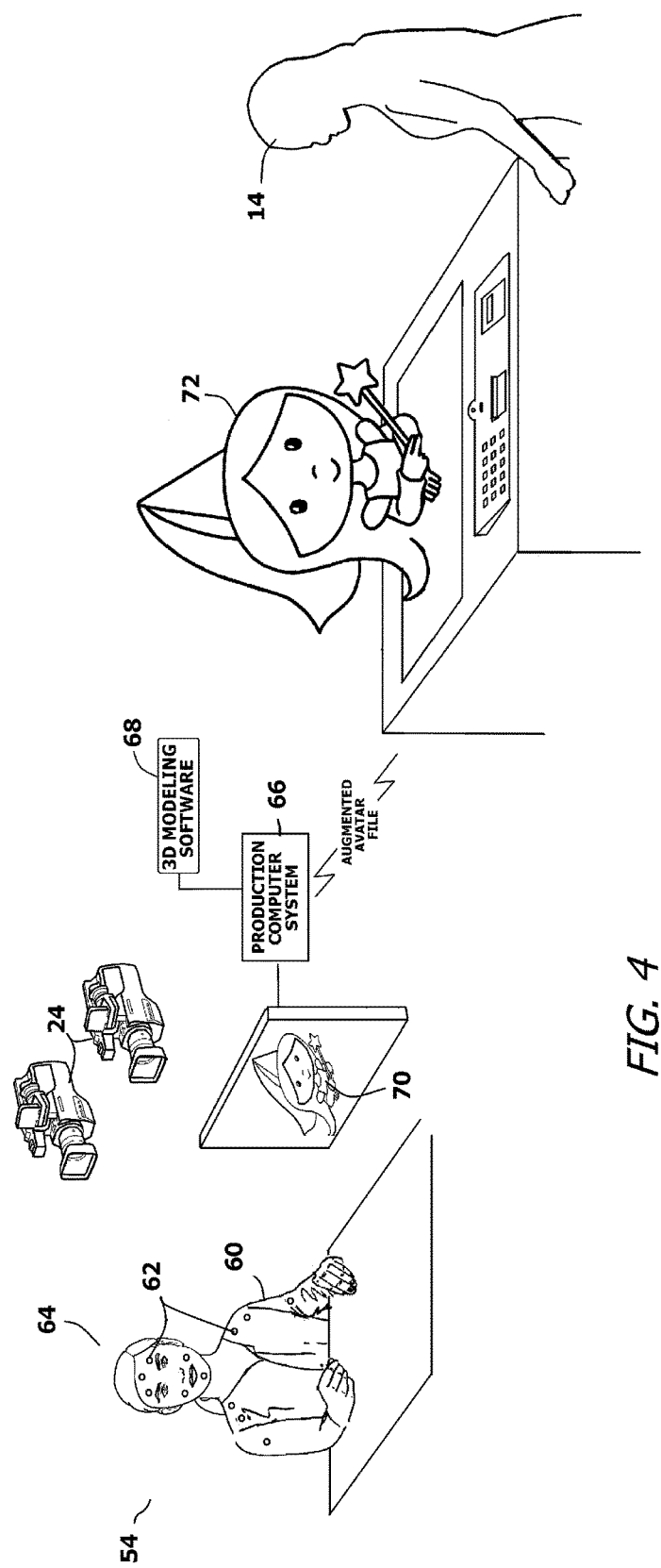
FIG. 4 is a diagram illustrating the present invention system being utilized in a third exemplary use.

It has been previously stated that although a production video file is produced by imaging a camera subject in a live production set, the 3D images being viewed by a viewer need not look like or sound like the camera subject. Rather, the movements of the camera subject at the live production set can be used to animate a virtual avatar. Referring to FIG. 4, it can be seen that markers 62 can be worn by a camera subject 60 in a live production set 64. The camera subject 60 is imaged in the manner previously described. The production computer system 66 runs modeling software 68 that generates a virtual model 70 and manipulates the virtual model 70 as directed by the movement of the markers 62 on the camera subject 60. The 3D effects that cause the virtual model 70 to appear to project forward or above the display screen when viewed are added. This produces a final live avatar 72 that appears in 3D. The live avatar 72 can look like anyone or anything. In the shown example, the virtual live avatar 72 looks like a cartoon fairytale princess. Such a virtual live avatar 72 can be used at reception stations in an amusement park.

Figure 5:
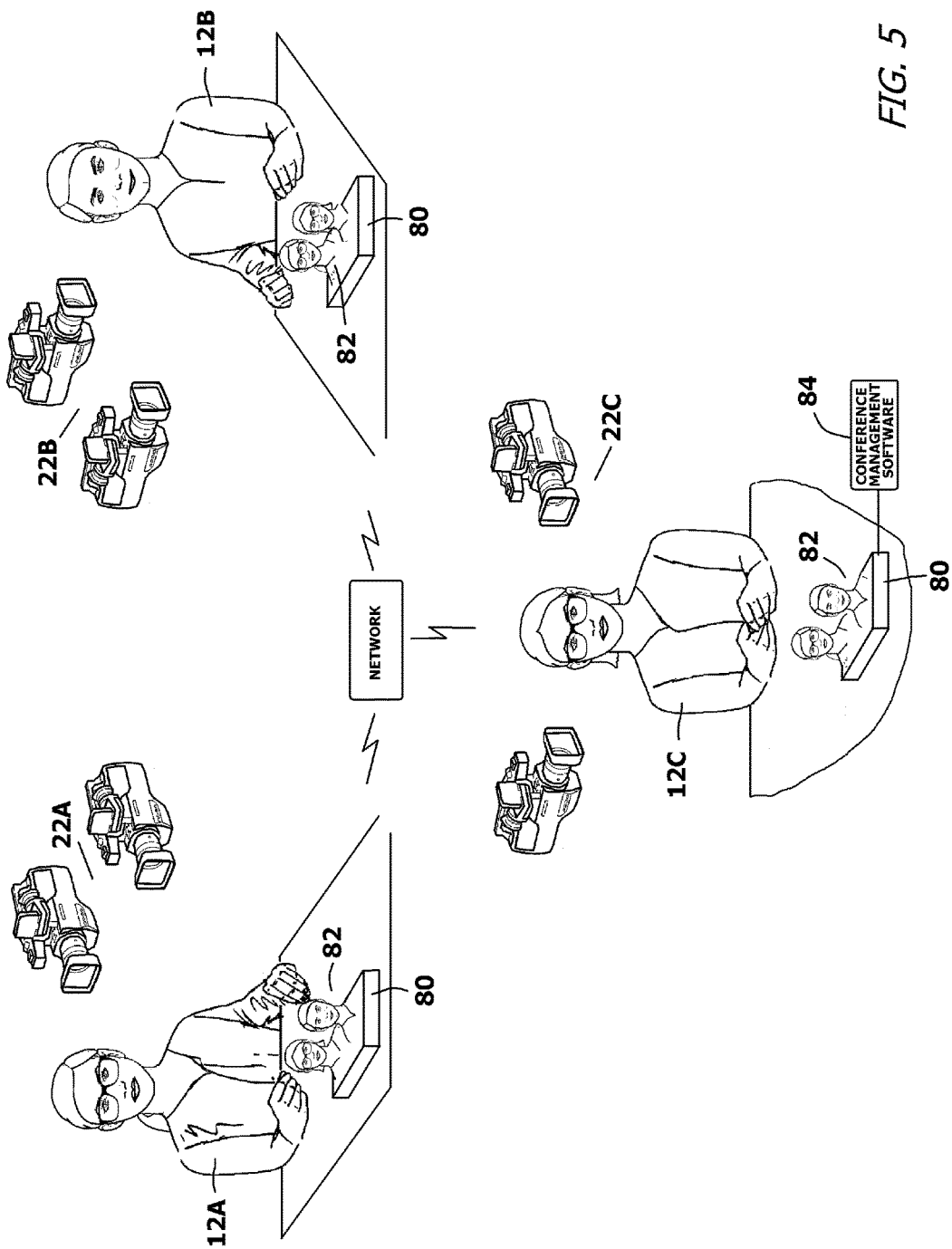
FIG. 5 is a diagram illustrating the present invention system being used for a conference call with multiple parties simultaneously.

In the previous embodiments, two-way communications are established. However, 3D images are only sent in one direction and are viewed by one party. This need not be the case. Referring to FIG. 5, it can be seen that multiple production sets 22A, 22B, 22C can be established. Each production set 22A, 22B, 22C has a camera subject 12A, 12B, 12C with the before-described equipment and software needed to produce enhanced 3D images 82 of each camera subject 12A, 12B, 12C. In addition, each production set 22A, 22B, 22C is provided with an electronic display 80 that can display the 3D images 82 from a different location. Each electronic display 80 is part of electronic equipment that runs a conference call management software application 84. The conference call management software application 84 enables any viewer at any of the live production sets to view the 3D image of any or all of the 3D images partaking in the conference.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A method of communicating between a first location and a second location, wherein an electronic device with a display screen is provided at said second location, said method comprising the steps of:
    imaging a subject at said first location with stereoscopic video cameras to obtain stereoscopic footage, wherein said subject is positioned on a production set;
    creating a production video file by digitally enhancing said stereoscopic footage with 3D effects, wherein digitally enhancing said stereoscopic footage includes digitally tapering said subject within at least a portion of said stereoscopic footage by decreasing said subject as a function of elevation above said production set;
    transmitting said production video file to said electronic device through a data network;
    playing said production video file on said electronic device, wherein said production video file shows images of said subject on said display screen that appears three dimensional to a viewer.

2. The method according to claim 1, further including providing 3D glasses at said second location to view said images on said display screen.

3. The method according to claim 1, wherein said 3D effects cause at least part of said images to appear forward of said display screen and projecting out of said electronic device.

4. The method according to claim 1, wherein said 3D effects cause at least part of said images to appear vertically above said display screen and projecting out of said electronic device.

5. The method according to claim 1, wherein said production video file is a streaming video file and said images are streamed images that correspond in movement to said subject at said first location.

6. The method according to claim 1, wherein said production video file is recorded and stored for delayed transmission to said electronic device.

7. The method according to claim 1, wherein said second location communicates with said first location using said electronic device at said second location.

8. The method according to claim 1, further including the step of augmenting said production video file with a virtual model.

9. The method according to claim 8, wherein said virtual model appears three dimensional when said production video file is played on said electronic device.

10. The method according to claim 8, wherein said virtual model is selected at said first location.

11. The method according to claim 8, further including providing access to a database of available virtual models and selecting said virtual model from said database.

12. The method according to claim 1, wherein said stereoscopic cameras image said subject at a first perspective and wherein said virtual model is altered to match said first perspective.

13. A method of communicating between a first location and a second location, wherein an electronic device with a display screen is at said second location, said method comprising the steps of:
    setting up stereoscopic video cameras at said first location to obtain stereoscopic footage of said first location, wherein said stereoscopic video cameras have a common point of convergence;
    creating a video file by digitally enhancing said stereoscopic footage to produce 3D effects wherein said stereoscopic footage is digitally enhanced by digitally skewing said stereoscopic footage by digitally tilting said stereoscopic footage at said common point of convergence;
    transmitting said video file to said electronic device through a data network;
    playing said video file on said electronic device, wherein said video file plays as a video on said display screen that appears at least in part to be three dimensional when viewed at said second location.

14. The method according to claim 13, further including the step of providing 3D glasses at said second location to view said video playing on said display screen.

15. The method according to claim 13, wherein said 3D effects cause at least part of said video to appear to forward of said display screen and out of said electronic device.

16. The method according to claim 13, wherein said 3D effects cause at least part of said video to appear vertically above said display screen and out of said electronic device.

17. The method according to claim 13, wherein said second location communicates with said first location using said electronic device at said second location.

18. The method according to claim 13, further including the step of augmenting said video file with a virtual model.

19. The method according to claim 18, wherein said virtual model is selected at said first location.

20. The method according to claim 18, further including providing access to a database of available virtual models and selecting said virtual model from said database at said first location.

21. The method according to claim 18, wherein said stereoscopic cameras image said first location at a first perspective and wherein said virtual model is altered to match said first perspective.

22. A method of communicating between a first location and a remote location, wherein an electronic device with a display screen is at said remote location, said method comprising the steps of:
- setting up stereoscopic video cameras at said first location to obtain stereoscopic footage of said first location from a first perspective;
- digitally enhancing said stereoscopic footage with 3D effects, therein creating a video file, wherein digitally enhancing said stereoscopic footage includes digitally bending said stereoscopic footage in an area by selecting a first bend point within said area and bending stereoscopic footage above said first bend point;
- selecting a virtual three dimensional model; orienting said three dimensional model to match said first perspective;
- overlaying said three dimensional model and said video file to create an augmented video file;
- transmitting said augmented video file to said electronic device through a data network;
- playing said augmented video file on said electronic device, wherein said augmented video file plays as a video on said display screen that appears at least in part to be three dimensional when viewed at said remote location.

* * * * *